United States Patent [19]

Boothroyd et al.

[11] Patent Number: 5,267,123
[45] Date of Patent: Nov. 30, 1993

[54] CASE FOR PORTABLE COMPUTER HAVING DISPLAY ACCESSIBLE WHEN LID IS CLOSED OVER THE KEYBOARD

[75] Inventors: Allen Boothroyd, Little Shelford; Martin Jackson, Withersfield, both of England

[73] Assignee: EO Europe Limited, Cambridge, United Kingdom

[21] Appl. No.: 835,426

[22] PCT Filed: Nov. 12, 1990

[86] PCT No.: PCT/GB90/01710
§ 371 Date: Feb. 24, 1992
§ 102(e) Date: Feb. 24, 1992

[87] PCT Pub. No.: WO91/07716
PCT Pub. Date: May 30, 1991

[30] Foreign Application Priority Data

Nov. 10, 1989 [GB] United Kingdom ............... 8925425

[51] Int. Cl.[5] .................... H05K 5/03; H05K 7/16; G06F 1/16

[52] U.S. Cl. .................... 361/680; 361/681; 403/61; 403/116; 16/361; 439/31; 206/305

[58] Field of Search .................... 364/708; 312/223.2; 403/61, 85, 116; 16/360, 361; 248/917–923; 439/27, 28, 31; 206/305; 361/380, 390–395, 399

[56] References Cited

U.S. PATENT DOCUMENTS

| | | | |
|---|---|---|---|
| 4,438,458 | 3/1984 | Münscher | 248/917 X |
| 4,523,087 | 6/1985 | Benton | 235/379 |
| 4,720,781 | 1/1988 | Crossland et al. | 340/700 X |
| 4,861,970 | 8/1989 | Hwang | 364/708 X |
| 5,002,184 | 3/1971 | Lloyd | 206/305 |

Primary Examiner—Leo P. Picard
Assistant Examiner—Michael W. Phillips
Attorney, Agent, or Firm—Lee, Mann, Smith, McWilliams, Sweeney & Ohlson

[57] ABSTRACT

A computer case having a base (10) incorporating a keyboard (14) which in the closed condition of the case is covered by a lid (12) having its display uppermost, the case opening by a mechanism enabling the lid to slide rearwardly and incline relatively to the base so as to present the display forwardly behind the keyboard.

13 Claims, 8 Drawing Sheets

CASE FOR PORTABLE COMPUTER HAVING DISPLAY ACCESSIBLE WHEN LID IS CLOSED OVER THE KEYBOARD

FIELD OF THE INVENTION

This invention relates to a case housing a computer and of the kind having a base incorporating a computer keyboard and a lid openable and closable relative to the base and incorpora ing a computer display. Such cased computers are gener lly intended to be portable, and may be of relatively small dimensions.

BACKGROUND TO THE INVENTION

Computer cases of the above-described kind are well known, wherein, when the case is open, the keyboard is made available at the upper surface of the base and the display is visible on the inner surface of the lid, said lid hinging open into a position in which it makes an obtuse angle with the base. Thus, assuming the base is placed on a generally horizontal support and the lid opened, the display is visible in an inclined plane sloping back from the base.

THE INVENTION

According to one aspect of the present invention, there is provided a computer case of the kind described wherein the display is incorporated in the lid to be visible at the outer surface thereof when the lid is closed against the top of the base, and the lid is movably mounted to the base to open to a position in which the display on said outer surface is visible in an inclined plane sloping back upwardly from the base.

The arrangement in accordance with the invention has the advantage that the keyboard may be protected and rendered inactive when the lid is closed.

In a preferred arrangement, the keyboard occupies only the front part of the width of the base from front to back, and in the open position the lid slopes back upwardly from the base just to the rear of the keyboard. The connection between the base and the lid is thereby able to include a hinged support which is accommodated between the base and the lid when the case is closed and which acts as a stay between the lid and the part of the base to the rear of the keyboard when the lid is open. Thus, in this preferred arrangement, the front edge of the lid (when the lid is closed) is slidably connected to the base, as by means of a guide-pin/track construction, and the above-described supporting stay is arranged to cause the lid to assume an increasing inclined position as the lid is pushed rearwardly on its slidable connection to the base. The angle of inclination chosen for the lid in its open position may be selectable by such means as a friction stop or detent means in the track for the guide pin.

The preferred arrangement is preferably such that, in the open condition of the lid, the area occupied by the cased computer, when seen in plan view, is not to any substantial extent larger than the plan area occupied by the closed case.

Preferably, the connection between the lid and the base is a separable connection, whereby the lid can be detached from the base. Thus, in one arrangement, the lid has a hinge pin detachably engaging with a socket at the adjacent end of the stay, and the front end of the track has a socket with which the track-engaging pin on the lid detachably engages.

If desired, the display can be made transparent, with a small source of power built into the lid if necessary, so that when the connection between the lid and the base is a separable connection, the lid can be detached to enable the display to be used in an overhead projector or similar apparatus for projecting the display onto a screen.

Again the lid may include appropriate circuitry and addressing means to enable the lid to be used as a portable computing aid when detached from the base.

It will be appreciated that an advantage of the cased computer of the invention is that the display is visible even when the case is closed. However, the back of the display is protected, being on the underside adjacent the base in the closed condition of the case. The back of the display can thus be equipped to carry out additional functions when the lid is open.

Thus, an addressing means for the display, in the form of a miniature second keyboard or a socket into which a miniature keyboard can be plugged, may be provided on the back of the display.

Thus, according to another aspect of the invention, in a cased computer of the kind described, and wherein the back of the display is on the i side in the closed condition of the case, the lid is provided on the back with communication means for use in communicating with other computers or the like. Such communication means may be constituted, for example, by hidden connectors, or by infra-red diodes for use in a connectionless network.

Preferably, however, a stylus in the form of a light pen is provided for interrogating the display on the lid, possibly to enter and edit data. The light pen may be garaged in a recess at one edge of the base or the lid, preferably being garaged in the lid when the lid is separable from the base.

Either the base or the lid may have a flap-type door on the lid allowing access to the light pen.

Normal communication between the base and the lid may be by means of an infra-red link, thus avoiding the need for connecting cable between the base and the lid, except possibly for a power link, which can also be avoided if the lid is equipped with its own battery source.

Alternatively, communication between the base and the lid may be by means of a multi-way plug and socket adapted to be engaged or disengaged when the lid is fitted to or separated from the base. In a preferred arrangement, in both the plug and the socket, the electrical contacts are recessed behind the plane of the front face of said plug or socket through which the contacts are exposed. In this way, risk of shorting between the contacts is avoided when the base and lid are separated and the plug and socket are exposed. Most desirably, the plug and socket are able to rotate relative to one another whilst maintaining cooperation between the contacts, thereby to maintain communication between the base and the lid when the lid is moved between its open and closed positions.

Especially when the display is of relatively fragile glass or the like, the computer case may include a flexible wrap-around cover secured to the rear underside of the base to be wrappable around the closed case so as to overlie the lid and being unwrappable and foldable to the underside of the case to enable the computer to be used.

According to still another aspect of the invention, there is provided a computer case of the kind described, wherein at least one of the base and the lid has a flap-type door of plastics material for enabling access o a computer accessory or an accessory socket, the door being integrally formed with a hinge produced by molecular orientation of the plastics material such that the chain molecules are orientated transverse to the hinge axis. The flap-type door may, for example, be used to cover a recess housing a light pen. The door may have a latch formed by integral edge pips which deform to be received behind the edge of the opening in which the door is hinged in order to hold the door closed.

DESCRIPTION OF EMBODIMENT

A computer case in accordance with the invention will now be exemplified with reference to the embodiment shown in the accompanying drawings, in which:

FIG. 1 shows a cased computer in plan view, with the casing closed;

FIGS. 2 and 3 respectively show the closed casing from the front and the side;

The general principle of the invention will first be described with reference to FIGS. 1 to 6 of the drawings, and further details then described with reference to subsequent figures.

A cased computer consists of a computer casing having a base 10 and a lid 12. The base 10 incorporates a keyboard 14 accessible at the upper surface of the base when the case is open. The lid 12 incorporates a display 16, such as an LCD display, which contrary to usual practice is visible at the upper surface of the lid in the closed condition of the case (see FIG. 1). It is to be noted that the keyboard 14 occupies only the front part of the width of the base 10 from front to back, the base also incorporating the CPU and a source of power (batteries).

Figure 5:
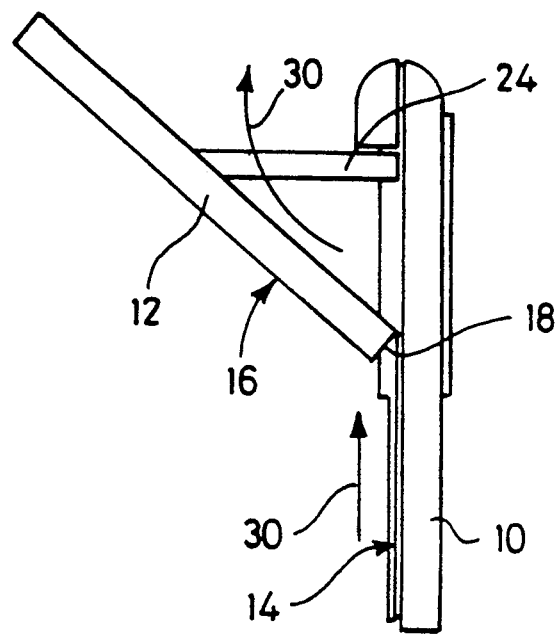
FIG. 5 shows the open casing from the side.

When the lid 12 is opened, it both slides rearwardly and turns upwardly and forwardly (see arrows 30) to the position shown in FIG. 5 so that the display 16 is nonvisible, from the front, in an inclined plane sloping upwardly and rearwardly from the base 10, with the bottom edge 18 of the lid just to the rear of the keyboard 14.

Figure 4:
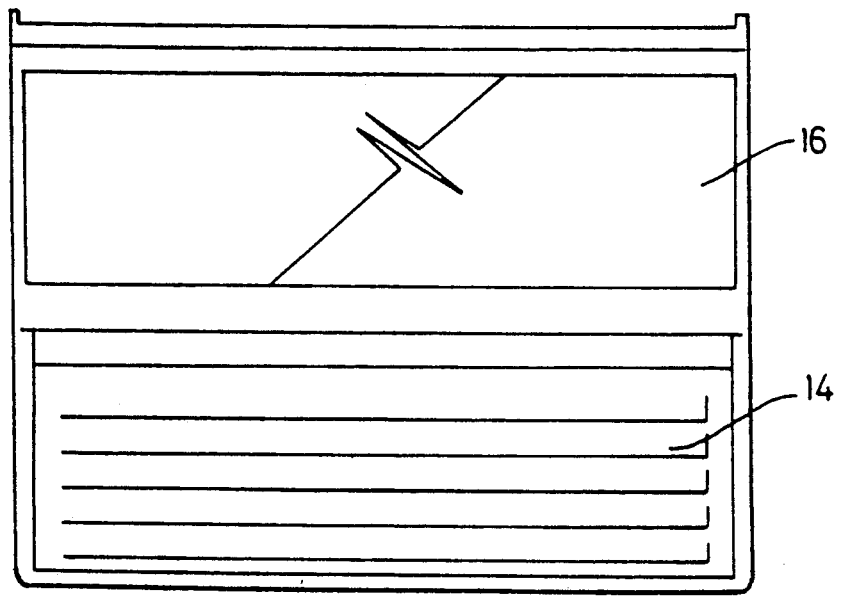
FIG. 4 shows the cased computer in plan view, with the casing open.
Figure 3:
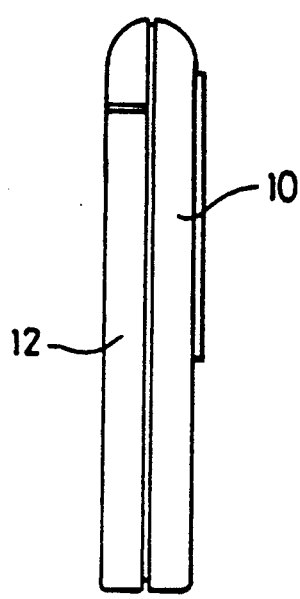
Figure 6:
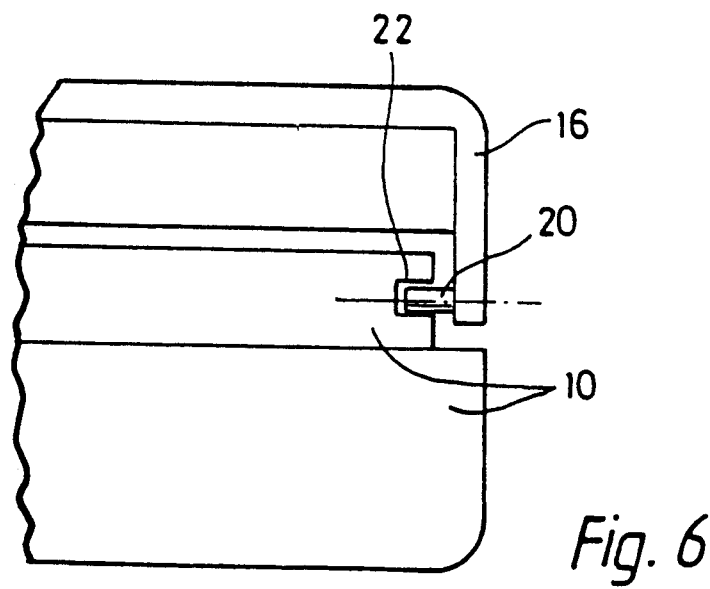
FIG. 6 is an enlarged cross-sectional of an end of the cased computer.

The required opening movement of the lid is obtained by means of guide pins 20 located at the front corners of the lid 12, engaging in tracks 22 running from front to back in the side faces of the base, together with a hinged support or stay 24 pivotally connected between the back of the lid 12 and the rear part of the base 10 (see FIGS. 4 and 6). At least one of the pivotal connections of the support, to the base or to the lid, may also include a pin and slot connection.

The arrangement is such that the support 24 acts as a stay for the lid 12 and thereby the display 16 in the open condition of the case, thus producing a robust and stable triangular configuration. A friction stop or mechanical detent means could be employed to enable the angle of the display to be adjustable.

Figure 1:
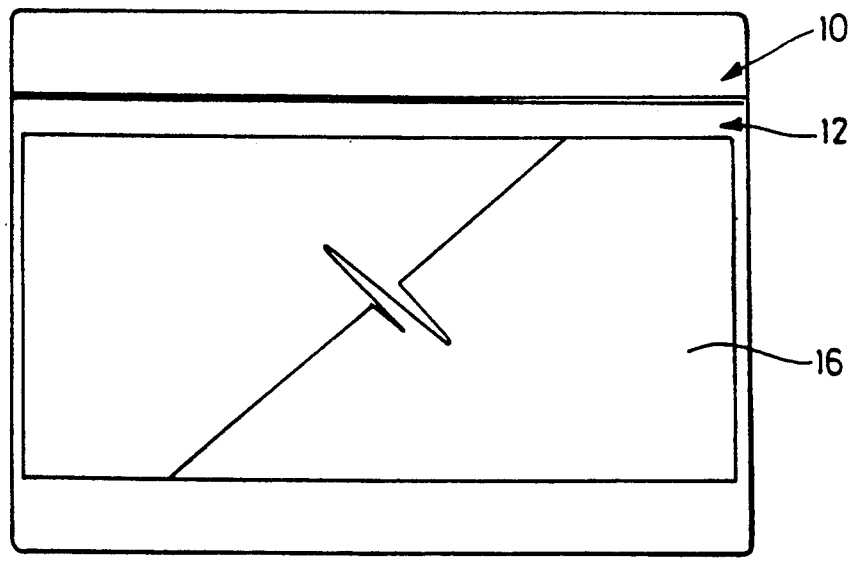
Figure 2:
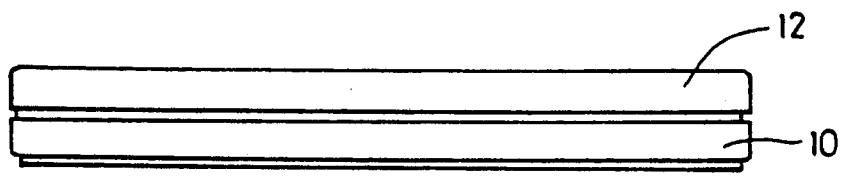

It will be noted from a comparison of FIGS. 1 and 4 that the plan area of the open case is not substantially greater than the plan area of the closed case, which is advantageous when the computer is to be used in a confined space, e.g. on the tray of an aeroplane seat. Moreover, the display is visible and usable, even when the case is closed.

If desired, the display can be of a transparent type, and the lid can be made detachable, to enable the display to be used in an optical projection means. If necessary, the lid may incorporate a secondary source of power to maintain the display when the lid is detached.

Moreover, as the back of the lid is protected in the closed condition of the case, it may incorporate hidden connectors, or possibly infra-red diodes for a connectionless network. It will be appreciated that this is not possible with a cased computer wherein the lid hinges open in a conventional manner, i.e. in analogous manner to a clamshell, because in the closed condition the base of the display is exposed. Clearly the present invention also overcomes the problem of possible instability which arises when a cased computer with a conventionally hinging lid is open.

Figure 7:
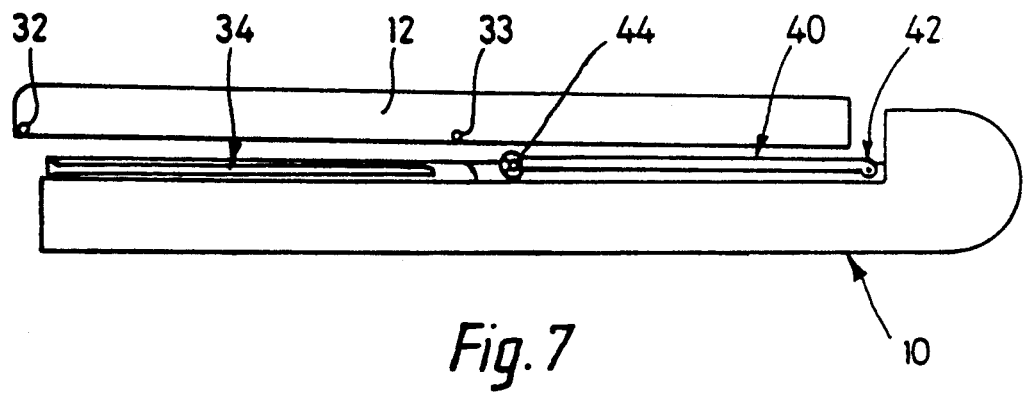
FIGS. 7 through 7D show details of the hinging assembly of the base and the lid.
Figure 7B:
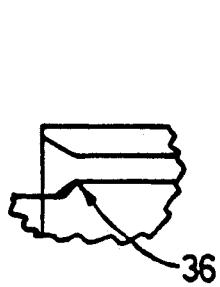
Figure 7C:
Figure 7D:
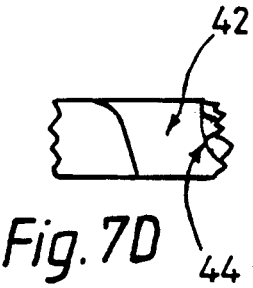
Figure 7A:
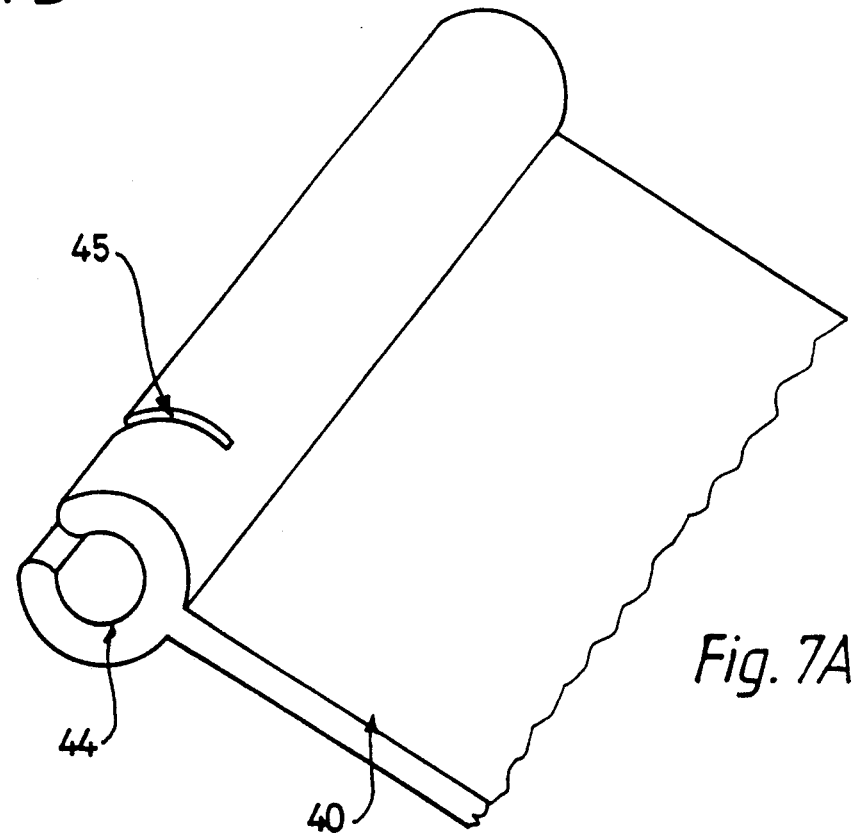

FIGS. 7 and 7A show one possible manner in which the base and the lid may detachably connect with one another. Identical arrangements are employed on both sides of the computer case.

The lid 12 is provided on its side edge with two pips or pins 32, 33, one pin 32 at the front and one pin 33 approximately mid-way front to back. The base 10 is provided with a track 34 open at its front end 36 and closed at its rear end 38, and to the rear of the track with a support or stay 40 hinged to the base at its rear end 42. Adjacent the front end of the stay, and just to the rear of the closed end 38 of the track 34, the base is provided with a guide slot 42 which leads to a claw 44 (FIG. 7A) at the front end of the stay.

Accordingly, in order to attach the lid to the base, the lid is offered downwardly and rearwardly onto the base so that the front pin 32 on the lid enters the front end of the track 34 and the pin 33 enters the guide slot 42. Subsequently, when the lid 12 is pushed rearwardly relative to the base 10, the pin 33 snap fits into the claw 44 to form a hinge between the front end of the stay 40 and the lid. The lid 12 can be detached from the base 10 by reversing the action.

In FIG. 7A, reference 45 denotes a strain relief slot.

Although not clear from the figures, the entire track and stay interconnecting mechanism is preferably completely hidden when the lid is fully closed. Moreover, although not shown, a releasable latch may be incorporated for holding the computer case in its closed position.

The advantage of the described arrangement is that the display unit 12 is completely separable from the base unit 10 to provide a smaller, portable unit consisting simply of the display and a basic, miniature computer built into the lid. When additional facilities are required, such as a disc drive and/or full keyboard, the display unit is readily attached to the base unit. The base unit 10, whether or not the display unit 12 is fitted thereto, may be connected to a mains power supply, telephone and existing computer facilities, and these connections are left undisturbed when the display unit is separated from the base unit.

When detached, the display unit may be used as a basic computer by virtue of facilities provided, for example, on the back of the display, including a suitable addressing means.

Figure 8:
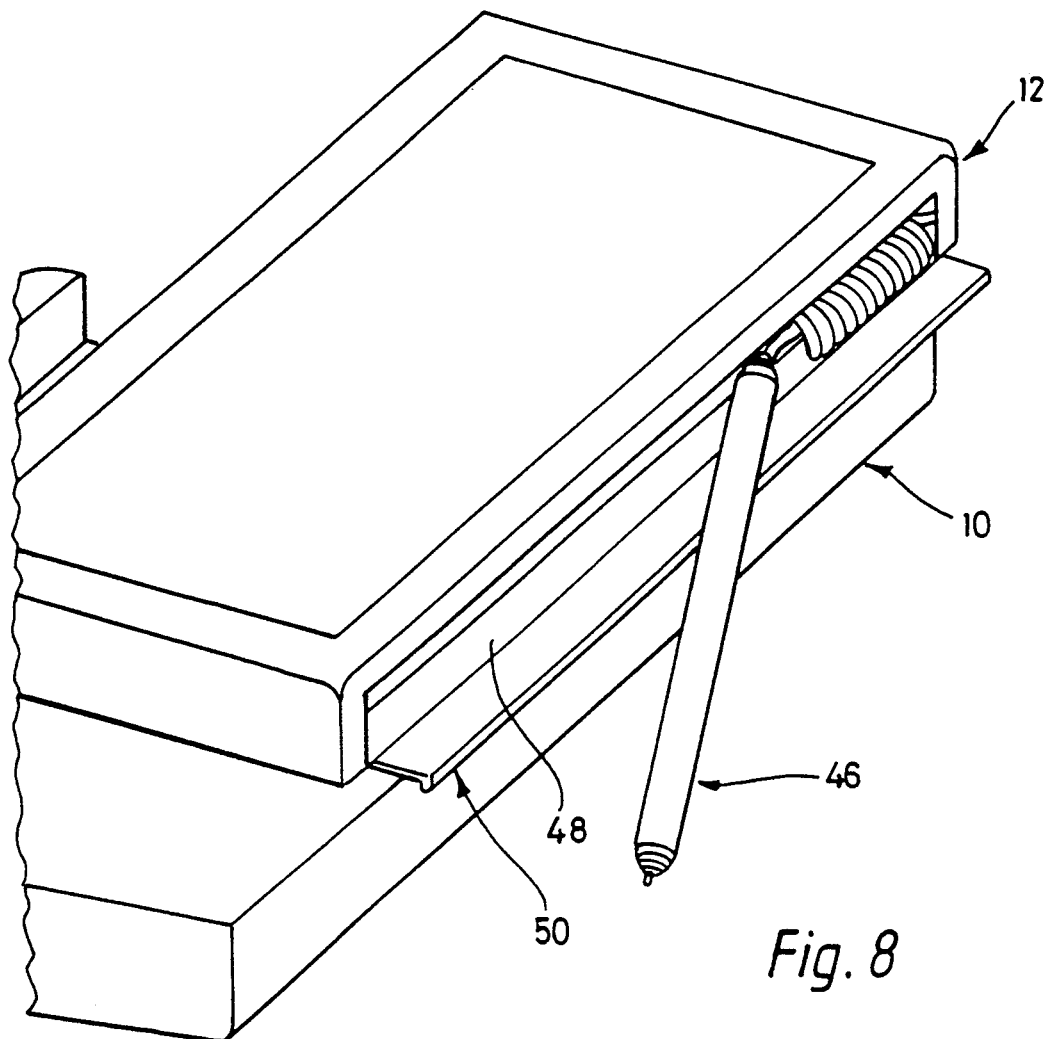
FIGS. 8 and 9 show the computer case when equipped with a light pen.

One convenient form of addressing means is shown in FIG. 8, and consists of a stylus in the form of a light pen 46 which can be used to address the display unit 12 via its screen, and possibly to enter and edit data.

The light pen 46 is housed in an elongate recess 48 in the back edge of the display unit or lid 12, the recess being closable to conceal the light pen by means of a flap door 50 which is later described.

Figure 9:
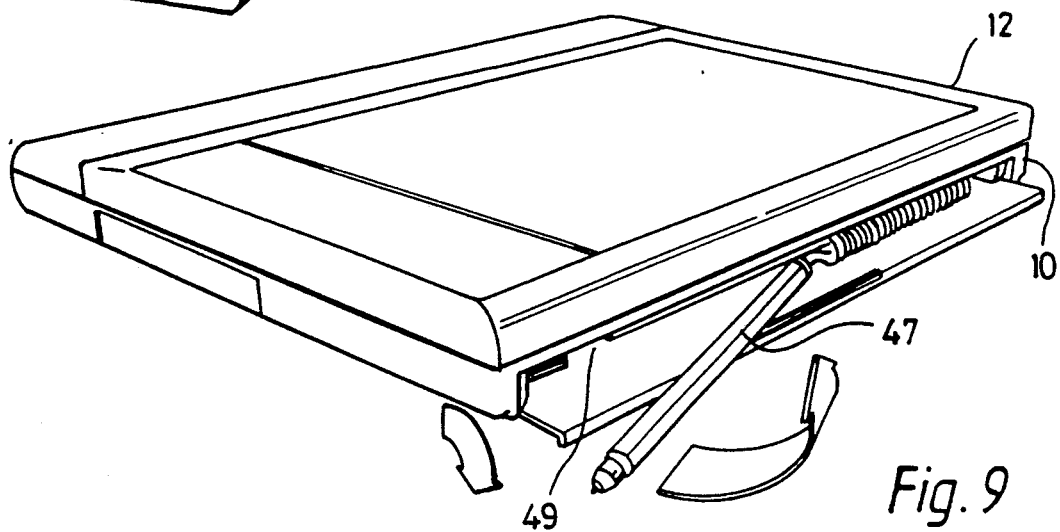

Instead of being garaged in the lid 12, the light pen could be garaged in an edge recess of the base 10, although garaging in the edge of the lid is preferred when the lid is separable from the base, as already described with reference to FIG. 8. For completeness, FIG. 9 shows the computer case with a light pen 47 garaged in a closable recess 49 in the base unit 10.

Figure 10:
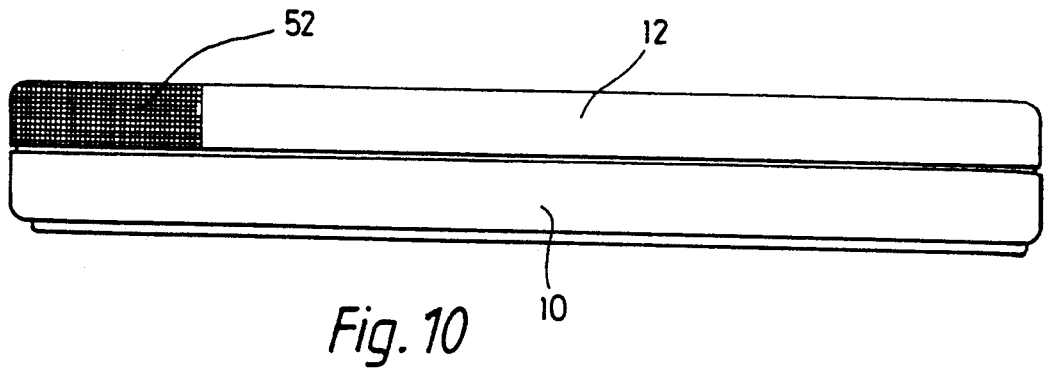
FIG. 10 shows the computer case equipped with an infra-red housing.

Communication between the base unit 10 and the display unit 12 may be effected in several ways. FIG. 10 shows the computer case in rear view, when equipped with an infra-red housing 52, enabling the base unit 10 and the display unit 12 to communicate without the use of physical connections. Equipping both the base unit 10 and the display unit 12 with an infra-red link would enable either such unit to communicate with other computer units which are similarly equipped.

Figure 11:
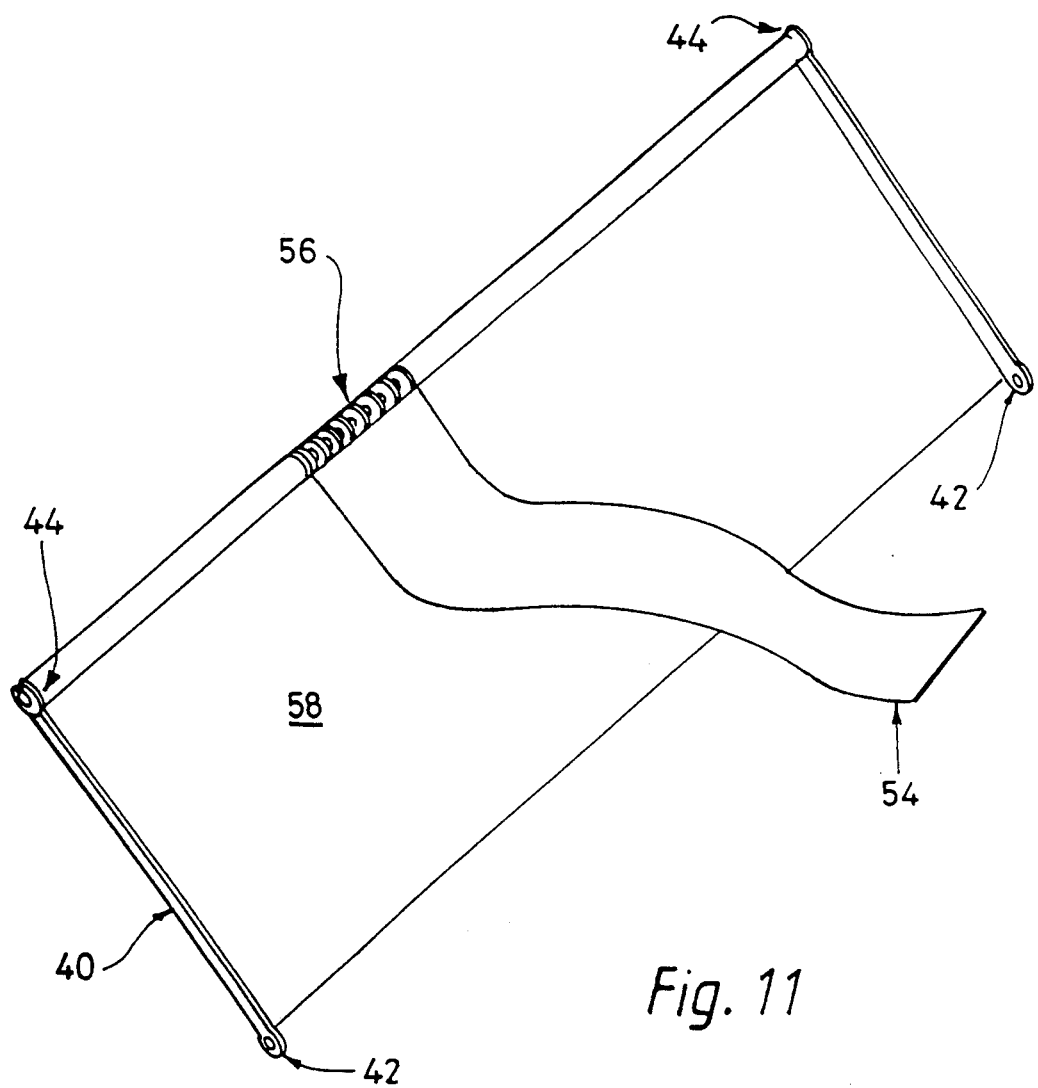
FIG. 11 shows an alternative communicating means between the base and the lid.

FIG. 11 shows in diagrammatic manner an interconnection between the base unit and the display unit by means of a multi-way cable 54 and a multi-way connector 56. Detail of the multi-way connector is shown in FIGS. 12A and 12B.

Referring to FIG. 11 first, a multi-way cable 54 leading from the base unit connects to one part 56 of a plug and socket connector which is incorporated in the front edge of a hinge support or plate 58 which interconnects the hinged stays 40 which operate between the base and the lid. The claws receiving the front pins of the lid can be seen at 44 and the rear pivot points of the stays are again referenced 42. The other part of the connector is incorporated in the edge of the display unit.

Figure 12A:
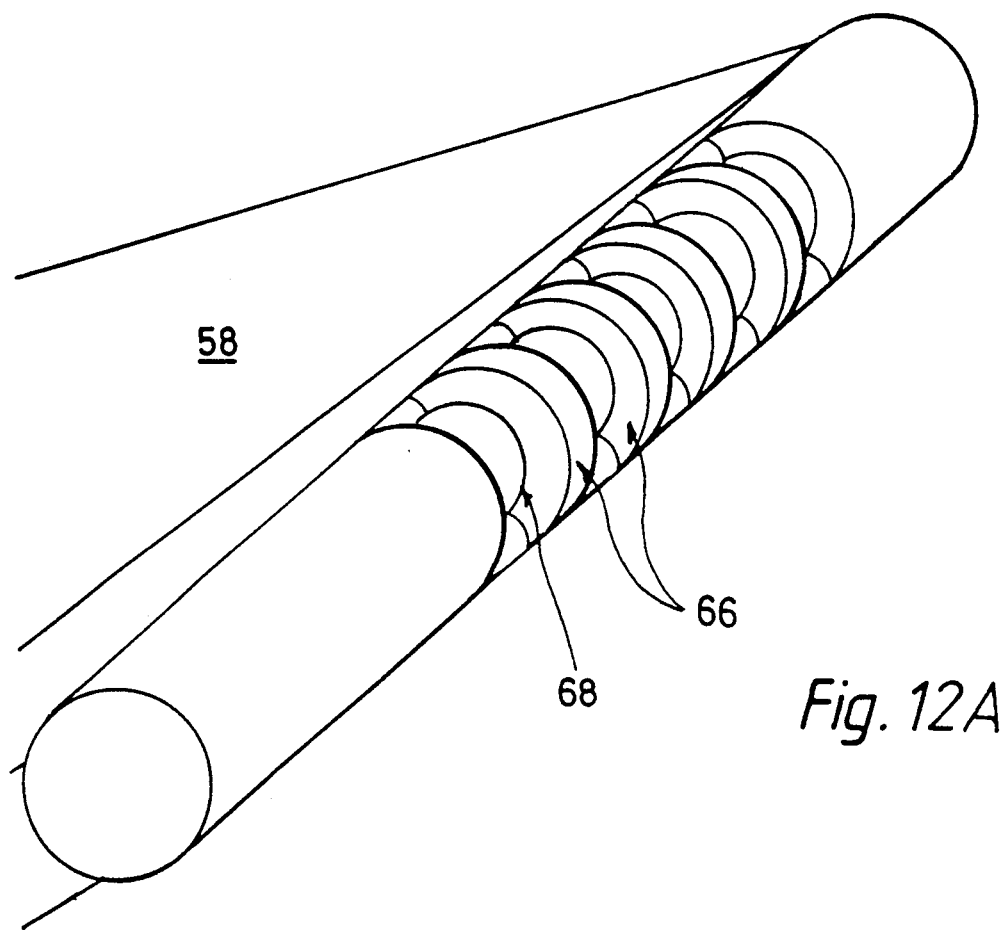
FIGS. 12A, 12B, 12C and 12D show details of a multi-way connector.
Figure 12B:
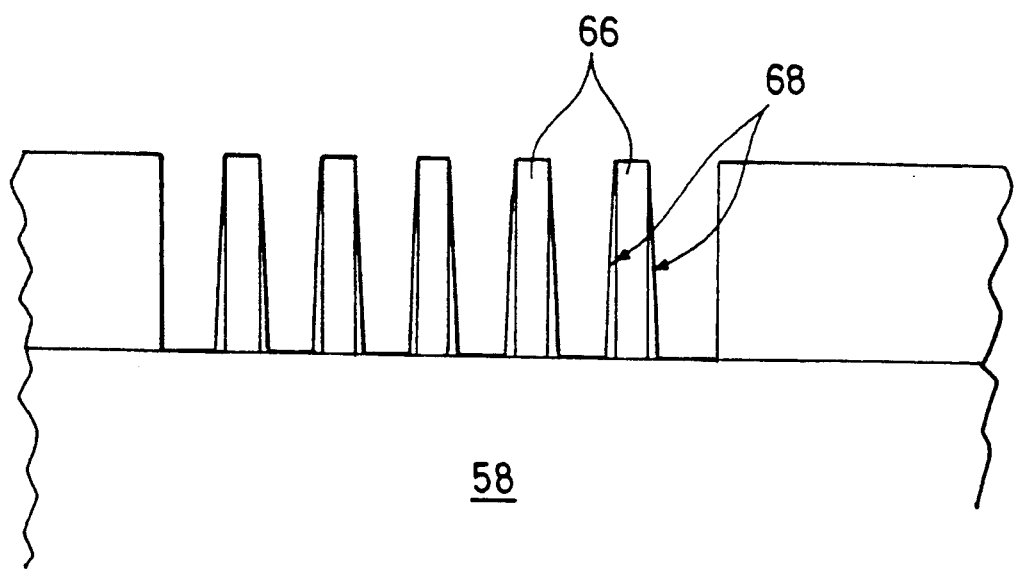
Figure 12C:
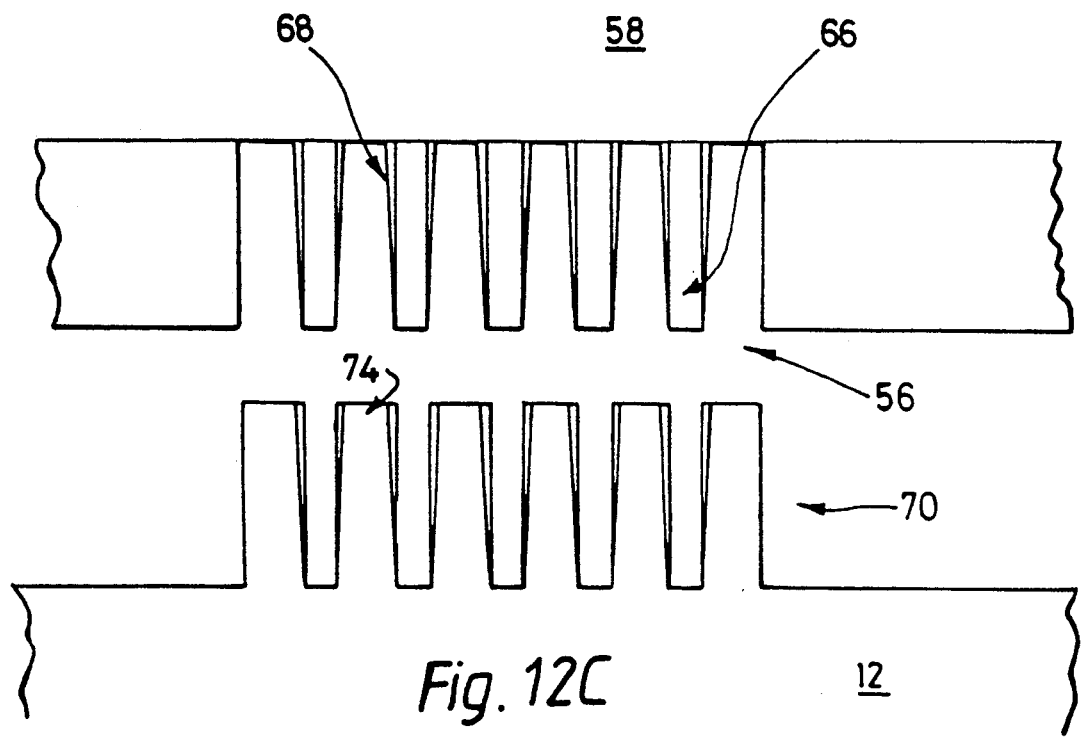
Figure 12D:
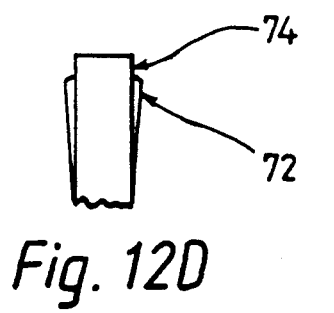

The form taken by the multi-way connector 56 in the front edge of the hinge plate 58 is shown in FIGS. 12A and 12B. It comprises a series of circular castellations or spacers 66 of electrically insulating material carrying on their side surfaces circular contacts 68 which are recessed inwardly of the outer edge plane or periphery of the connector. This can be seen both in the perspective view of FIG. 12A and in the side view of FIG. 12B. As indicated in FIG. 12C, a mating connector 70 is provided on the edge of the display unit 12, this connector also having contacts 72 recessed on its castellations or pins 74 inwardly of the peripheral plane of the connector.

When the display unit is interconnected with the base unit, the connector 70 on the display unit 12 automatically mates with the connector 56 to establish communication between the base unit and the display unit, which communication is maintained in all relative positions of the interconnected base and display units, as the contacts of the respective connectors rotate relative to one another with a self cleaning action.

More importantly, however, the recessing of the contacts of both connectors 56, 70 minimizes the risk of short-circuiting of contacts occurring when the display unit is separated from the base unit, for example due to laying the display unit down on a surface which is electrically conductive, such as a wet surface.

Figure 13:
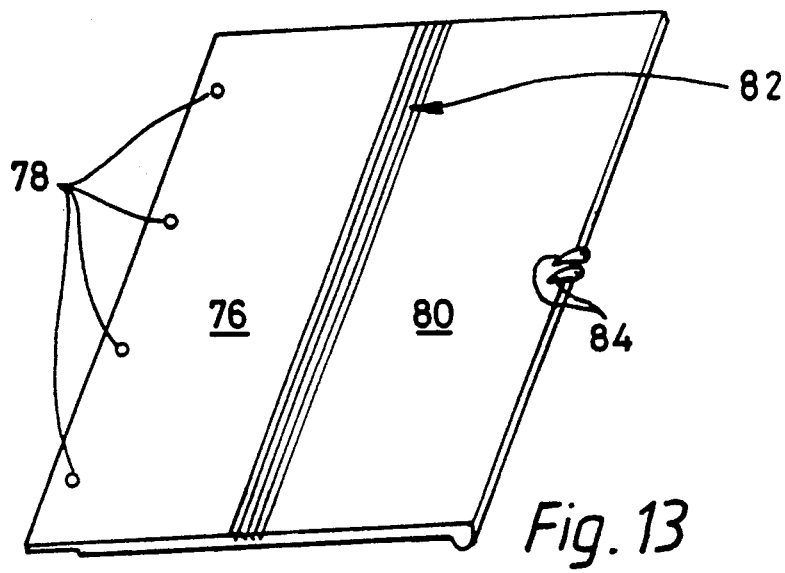
FIGS. 13, 13A and 13B shows a flap door construction.
Figure 13B:
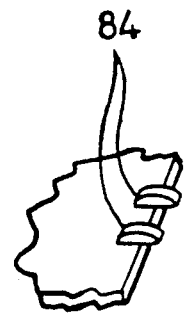
Figure 13A:
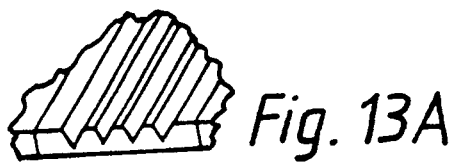

FIG. 13 shows details of a flap door construction which may be employed, for example, to cover the recess in which the above-described light pen is housed, but alternatively may be employed to cover access to an auxiliary socket on the computer base or lid.

This flap door is made of plastics material, more especially polypropylene, and has a part 76 provided with fixing points 78 at which it can be attached to the computer case (base or lid), and a flap 80 connected to the part 76 by an integral hinge 82. The hinge 82 may be formed, as shown, by lines of weakening in the plastics material, between the part 76 and the flap 80.

Most preferably, however, or additionally, the hinge 82 is formed, during production of the flap door, by molecular orientation of the polypropylene molecules at least in the region of the hinge, in particular so that the long molecule chains lie perpendicular or at least substantially transverse to the axis about which the hinge is to be operable. The door is molded flat, and its natural tendency due to molecular orientation is to return to its flat state. Thus, when closed, the door tries to open to its open flat condition. However, the door flap 80 is provided at its outer edge with a pair of pips 84 which deform to engage under the edge of the opening in which the door is fitted, thereby to lock the door closed. The door can thus be released by pressing inwardly and downwardly on the door in the region of the pips.

Figure 14:
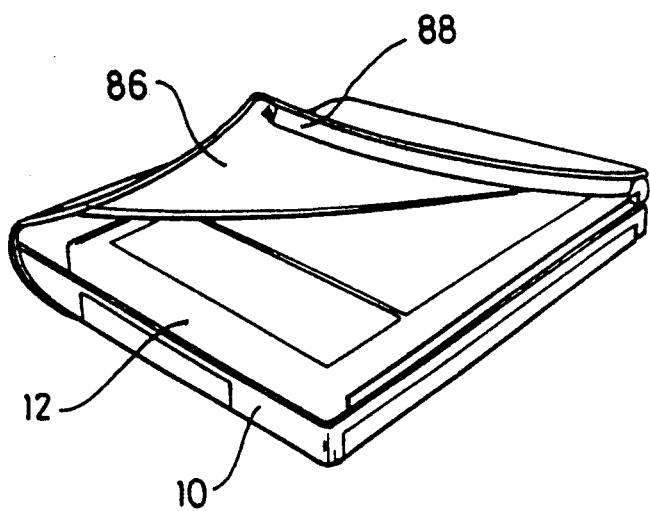
FIG. 14 shows the computer case fitted with a soft cover.

Finally, FIG. 14 shows the computer case equipped with a soft cover 86. This is attached to the underside of the rear of the base 10 and is wrappable, as shown in the drawing, over the lid 12, and in particular over the display, to fasten, by means of a catch 88 along the front edge of said cover, to the front face of the closed computer case. The cover is important to protect the display screen, which may be of a fragile material such as glass. However, it is readily unwrapped and folded to be out of the way behind and/or beneath the base of the computer case when the computer is in use.

Various modifications of the above described and illustrated arrangement are possible within the scope of the invention. Although not shown, the keyboard may alternatively be a computer peripheral or other piece of apparatus such as a CD-Rom drive or DAT mechanism, which is revealed when the case is opened. Likewise in place of a light pen position sensing probe, an electrostatic or electromagnetic stylus may be employed in conjunction with a suitable grid of conductors associated with the screen display, or the display screen may be coated with a resistive film and a conductive probe employed; and the term light pen as used herein is to be construed to mean any position sensing probe.

We claim:

1. A computer comprising:
   a base having a front and a rear;
   a keyboard carried by the base;
   a lid having a front and a back and a closed position in which said lid covers the keyboard;
   a display means carried by the lid and having a viewing surface exposed in the closed position of the lid; and mounting means movably mounting the lid to the base to enable movement of the lid into an open position, said mounting means comprising means by which the lid can be displaced rearwardly relative to the base and the back of the lid lifted so that in its open position the lid is disposed in an inclined position uncovering and to the rear of the keyboard with the viewing surface of the display means facing forwardly.

2. A computer according to claim 1, wherein, in the open condition of the lid, the area occupied by the computer, when seen in plan view, is not to any substantial extent greater than the plan area occupied by the closed case.

3. A computer according to claim 1, wherein the connection between the lid and the base is a separable connection, whereby the lid can be detached from the base.

4. A computer according to claim 3, in which communication between the lid and the base is by means of a multi-way plug and socket adapted to be engaged or disengaged when the lid is fitted to or separated from the base.

5. A computer according to claim 4, wherein, in both the plug and the socket, the electrical contacts are recessed behind the plane of the front face of said plug or socket through which the contacts are exposed.

6. A computer according to claim 4, in which the plug and socket are able to rotate relative to one another whilst maintaining cooperation between the contacts, thereby to maintain communication between the base and the lid when the lid is moved between its open and closed positions.

7. A computer according to claim 1, having a flexible wrap-around cover secured to the rear underside of the base to be wrappable around the closed case so as to overlie the lid and being unwrappable and foldable to the underside of the case to enable the computer to be used.

8. A computer according to claim 1 wherein the mounting means comprises, on each side of the case, a track on the base and a pin on the lid slidably cooperating with said track, whereby the front of the lid is guided for movement in the front to back direction of the base, and a hinged stay pivotally connected at one end to the base and at the other end to the lid, whereby the back of the lid is guided for upward and rearward movement relative to the base when the front of the lid is moved rearwardly.

9. A computer according to claim 8, in which the lid has a hinge pin detachably engaging with a socket at the adjacent end of the stay, and the front end of the track has a socket with which the pin on the lid detachably engages.

10. A computer according to claim 1, wherein the mounting means comprises:
track means by which the lid is displaceable rearwardly relative to the base; and
lifting means by which the back of the lid is liftable relative to the base.

11. A computer according to claim 10, wherein the lifting means is automatically operable when the lid is displaced rearwardly.

12. A computer comprising a display incorporated in a lid, the display being incorporated such that the display is visible at an outer surface of the lid when the lid is closed against and covers a base for the computer, the lid being movably mounted on the base to open to a position in which the display on said outer surface is visible in an inclined plane sloping back upwardly from the base, the base and the lid including a connection comprising, on each side of the case, a track on the base and a pin on the lid slidably cooperating with said track, whereby the front of the lid is guided for movement in a front-to-back direction of the base, and further including a hinged stay pivotally connected at one end to the base and at its other end to the lid, whereby the back of the lid is guided for upward and rearward movement relative to the base when the front of the lid is moved rearwardly.

13. A portable computer comprising:
a housing;
a keyboard carried by said housing; and
display means having a viewing surface and an opposing surface;
means coupling said display means to said housing for enabling movement of the display means from a closed position in which the display means covers the keyboard with said opposing surface adjacent said keyboard and an open position in which the keyboard is uncovered and the display means is positioned rearwardly of the keyboard at a viewing angle;
said coupling means comprising means for guiding the display means rearwardly of the housing and also tilting the display means relative to the housing.

* * * * *